US012807213B2

(12) United States Patent
Lee et al.

(10) Patent No.: US 12,807,213 B2
(45) Date of Patent: Nov. 24, 2026

(54) POWER ASSISTED STEERING DEVICE

(71) Applicant: HL MANDO CORPORATION, Gyeonggi-do (KR)

(72) Inventors: Jongbaek Lee, Gyeonggi-do (KR); Inhwan Jeon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 424 days.

(21) Appl. No.: 18/388,770

(22) Filed: Nov. 10, 2023

(65) Prior Publication Data

US 2024/0199110 A1 Jun. 20, 2024

(30) Foreign Application Priority Data

Dec. 19, 2022 (KR) ........................ 10-2022-0177778

(51) Int. Cl.
*B62D 5/04* (2006.01)

(52) U.S. Cl.
CPC ......... *B62D 5/0448* (2013.01); *B62D 5/0424* (2013.01)

(58) Field of Classification Search
CPC .. B62D 5/0448; B62D 5/0424; B62D 5/0403; B62D 5/0421; B62D 3/12; B62D 5/0423; F16H 25/2204; F16H 25/2214
See application file for complete search history.

(56) References Cited

U.S. PATENT DOCUMENTS

| | | | | |
|---|---|---|---|---|
| 8,997,597 B2 * | 4/2015 | Rupp | B62D 3/06 74/388 PS |
| 2011/0048838 A1 * | 3/2011 | Asakura | B62D 5/0448 180/444 |
| 2014/0090921 A1 * | 4/2014 | Shavrnoch | B62D 5/0448 474/166 |
| 2017/0174253 A1 * | 6/2017 | Kitamura | B62D 5/0448 |

(Continued)

FOREIGN PATENT DOCUMENTS

| | | |
|---|---|---|
| JP | 2010-247675 | 11/2010 |
| KR | 10-1372792 | 3/2014 |
| KR | 10-2014-0047857 | 4/2014 |

(Continued)

OTHER PUBLICATIONS

Span et al., Transmission Assembly for an Electromechanical Power Steering Device, May 21, 2015, EPO, WO 2015/071057 A1, Machine Translation of Description (Year: 2015).*

(Continued)

*Primary Examiner* — James A English
(74) *Attorney, Agent, or Firm* — WOMBLE BOND DICKINSON (US) LLP

(57) ABSTRACT

A power assisted steering device comprises a rack bar having an outer circumferential screw groove formed on an outer circumferential surface of the rack bar; a ball nut having an inner circumferential screw groove corresponding to the outer circumferential screw groove of the rack bar and formed on an inner circumferential surface of the ball nut to be rotatably coupled to the rack bar via balls, and a nut (Continued)

fastening portion formed on an outer circumferential surface; and a nut pulley coupled to the outer circumferential surface of the ball nut and having a pully fastening portion coupled to the nut fastening portion and formed on an inner circumferential surface of the nut pulley.

16 Claims, 9 Drawing Sheets

(56) References Cited

U.S. PATENT DOCUMENTS

| | | | | |
|---|---|---|---|---|
| 2021/0380159 | A1* | 12/2021 | Heo | B62D 3/08 |
| 2022/0266893 | A1 | 8/2022 | Kim | |

FOREIGN PATENT DOCUMENTS

| | | | | | |
|---|---|---|---|---|---|
| KR | 20180039515 | A | * | 4/2018 | B62D 5/0448 |
| KR | 20200006855 | A | * | 1/2020 | C08J 5/04 |
| KR | 10-2022-0120823 | | | 8/2022 | |
| WO | WO-2015071057 | A1 | * | 5/2015 | B62D 5/0448 |

OTHER PUBLICATIONS

Kim et al., Organic-Inorganic Composite and R-EPS Belt Pulley Using the Same, Jan. 21, 2020, USPTO, KR 20-2020-0006855 A, Machine Translation of Description (Year: 2020).*

Office Action dated Feb. 20, 2026 for Korean Patent Application No. 10-2022-0177778 and its English translation provided by Applicant's foreign counsel.

* cited by examiner

POWER ASSISTED STEERING DEVICE

CROSS-REFERENCE TO RELATED APPLICATION

This application claims priority from Korean Patent Application No. 10-2022-0177778, filed on Dec. 19, 2022, which is hereby incorporated by reference for all purposes as if fully set forth herein.

BACKGROUND

Technical Field

Embodiments of the present disclosure generally relate to a power assisted steering device and, more specifically, to a power assisted steering device which can provide easier coupling between a ball nut and a nut pulley, simplify a manufacturing process, reduce weights of the ball nut and nut pulley, and secure required rigidity.

Description of Related Art

Power assisted steering is a system for reducing a driver's effort to turn a steering wheel of a vehicle, by using a power source to assist steering. For example, hydraulic or electric actuators may add controlled power to a steering mechanism of the vehicle, so the driver can provide less effort to turn the wheels when driving at typical speeds, and considerably reduce the physical effort necessary to turn the wheels when the vehicle is stopped or moving slowly. The power assisted steering can also be engineered to provide some artificial feedback of forces acting on the wheels.

BRIEF SUMMARY

According to some embodiments of the present disclosure, a power assisted steering device may allow for easily coupling between a ball nut and a nut pulley, simplify a manufacturing process, reducing weights of the ball nut and the nut pulley, and securing required rigidity.

According to the present embodiments, there may be provided a power assisted steering device comprising a rack bar having an outer circumferential screw groove formed in an outer circumferential surface, a ball nut having an inner circumferential screw groove, corresponding to the outer circumferential screw groove, formed in an inner circumferential surface to be rotatably coupled to the rack bar via a ball and having a nut fastening portion formed on an outer circumferential surface, and a nut pulley coupled to the outer circumferential surface of the ball nut and having a pully fastening portion, coupled to the nut fastening portion, formed on an inner circumferential surface.

According to the present embodiments, there may be provided a power assisted steering device comprising a ball nut rotatably coupled to a rack bar via a ball, having a large diameter portion having a diameter increasing outward in a radial direction on an outer circumferential surface, and having a nut fastening portion formed in the large diameter portion and a nut pulley coupled to an outer circumferential surface of the ball nut, having a pulley fastening portion coupled to the nut fastening portion on an inner circumferential surface of an end portion thereof, and formed of one or more materials selected from the group consisting of poly acetal (POM), poly amide (PA), poly carbonate (PC), poly imide (PI), polybutylene terephthalate (PBT), polyphenylene sulfide (PPS), and phenol formaldehyde (PF).

According to certain embodiments of the present disclosure, it is possible to allow for easily coupling between a ball nut and a nut pulley, simplifying a manufacturing process, reducing weights of the ball nut and the nut pulley, and securing required rigidity in a power assisted steering device.

Further, according to the present embodiments, it is possible to reduce vibration and rattle generated while the ball nut and the nut pulley operate, thereby providing convenience and comfort to the driver while driving.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
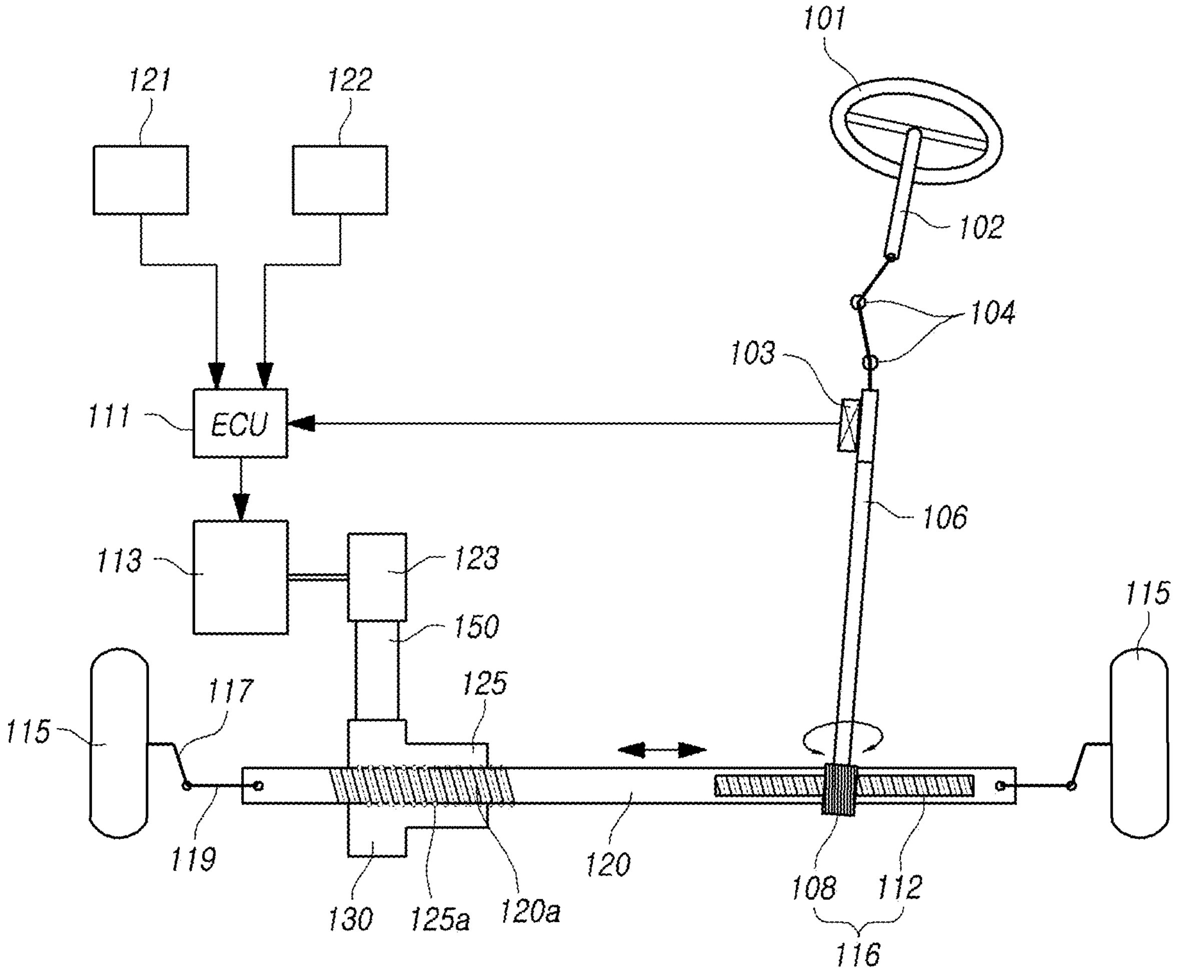
FIG. 1 is a view schematically illustrating a configuration of a power assisted steering device according to an embodiment of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
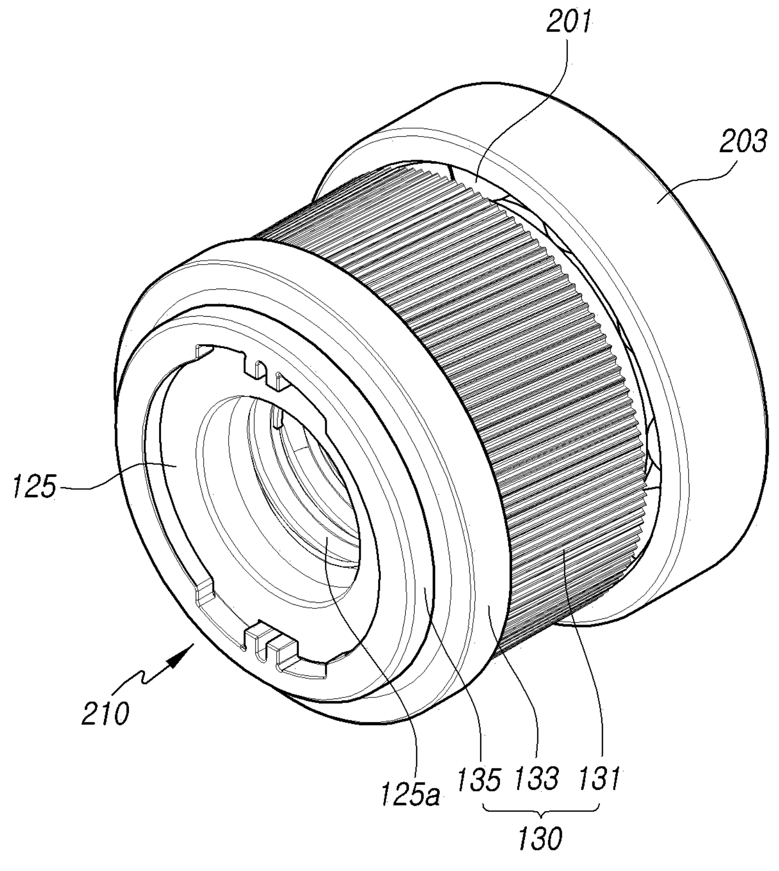
FIG. 2 is a perspective view illustrating a portion of a power assisted steering device according to an embodiment of the present disclosure.
Figure 3:
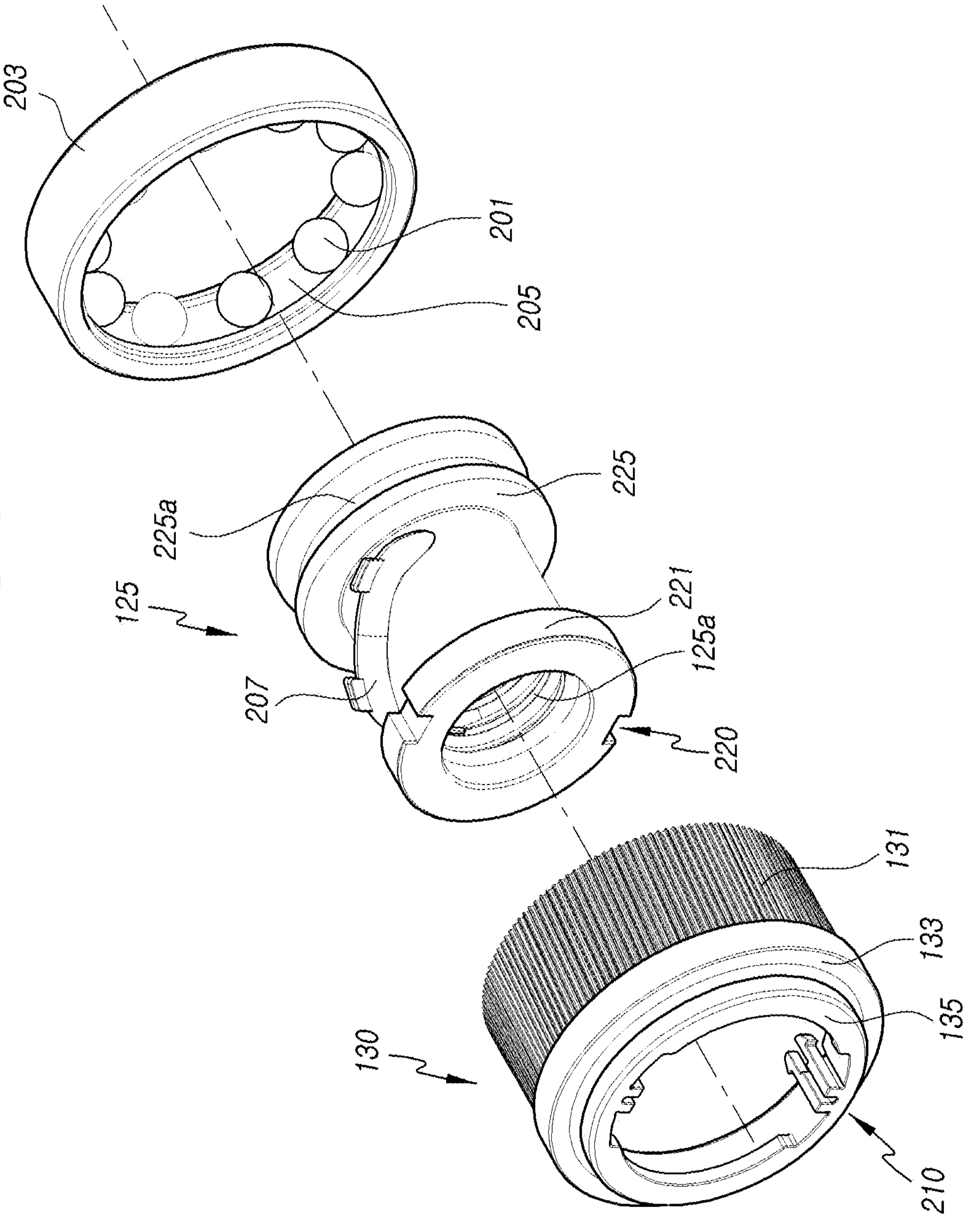
FIG. 3 is an exploded perspective view illustrating a portion of a power assisted steering device according to an embodiment of the present disclosure.
Figure 4:
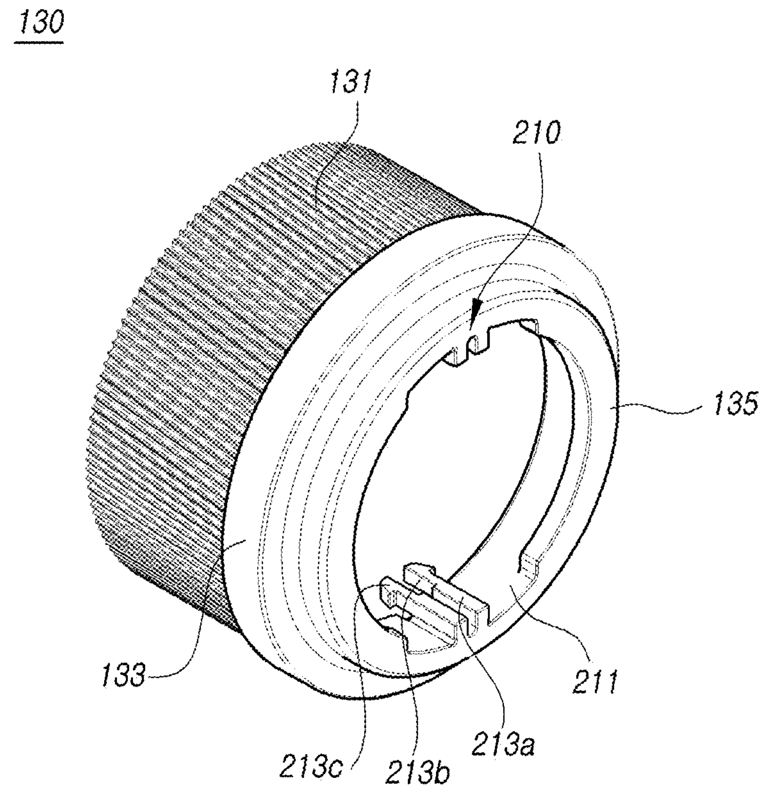
FIG. 4 is a perspective view illustrating a portion of a power assisted steering device according to an embodiment of the present disclosure.
Figure 5:
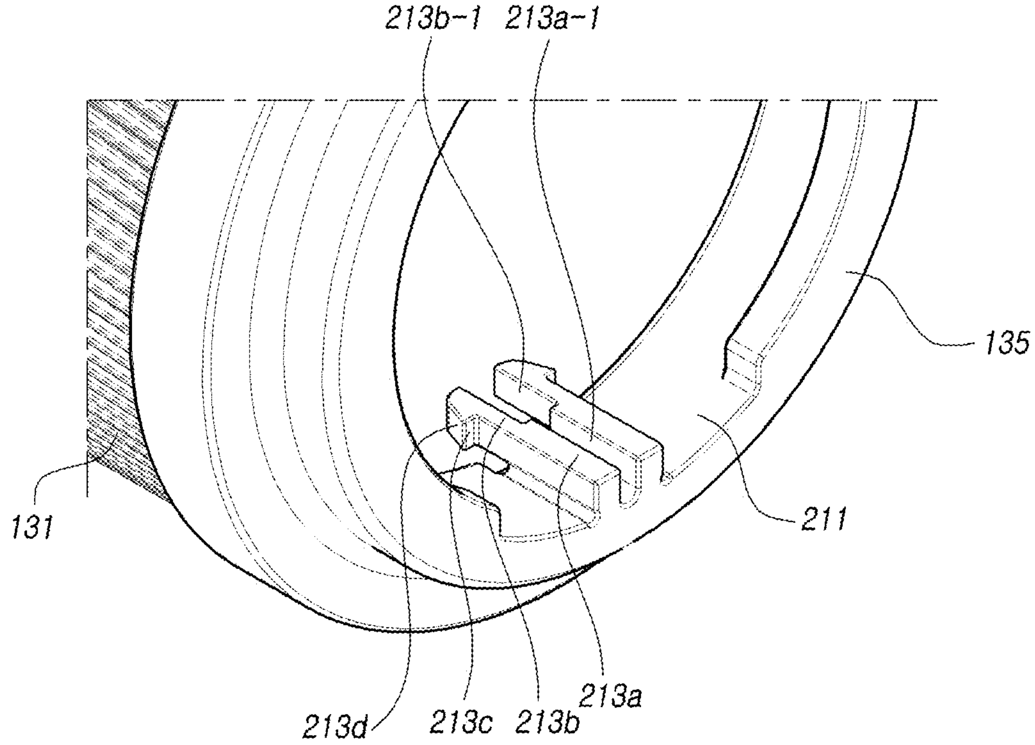
FIG. 5 is an enlarged view of a portion of FIG. 4.
Figure 6:
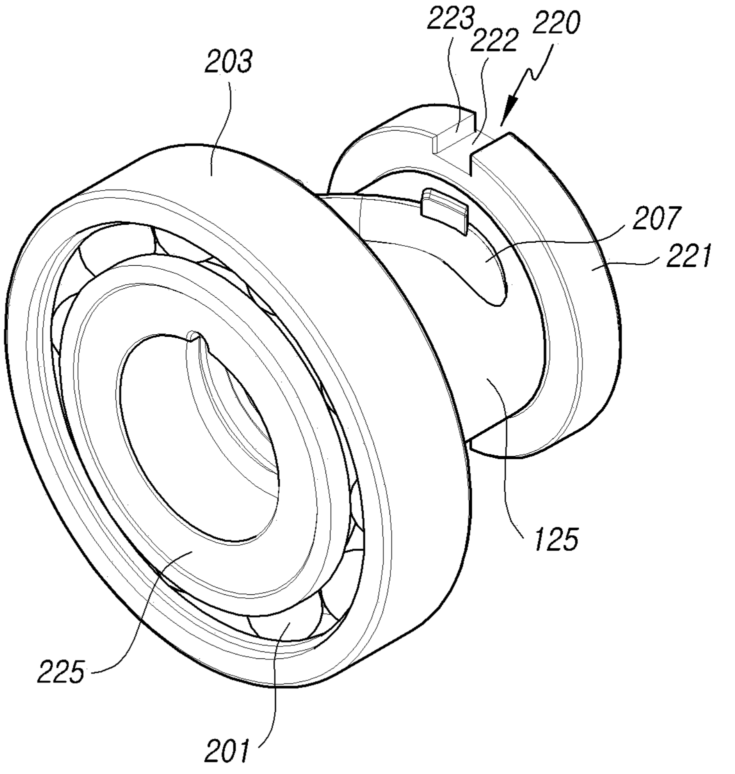
FIGS. 6 and 7 are perspective views illustrating a portion of a power assisted steering device according to an embodiment of the present disclosure.
Figure 7:
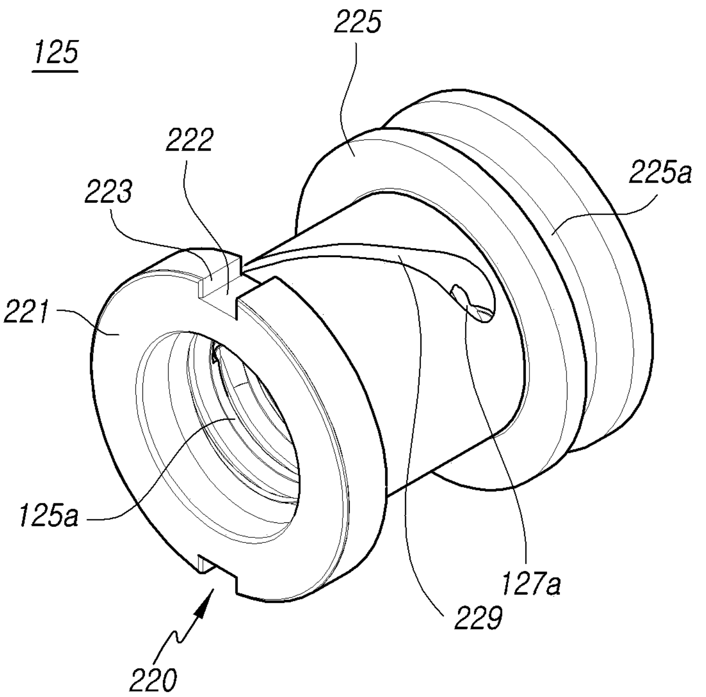
Figure 8:
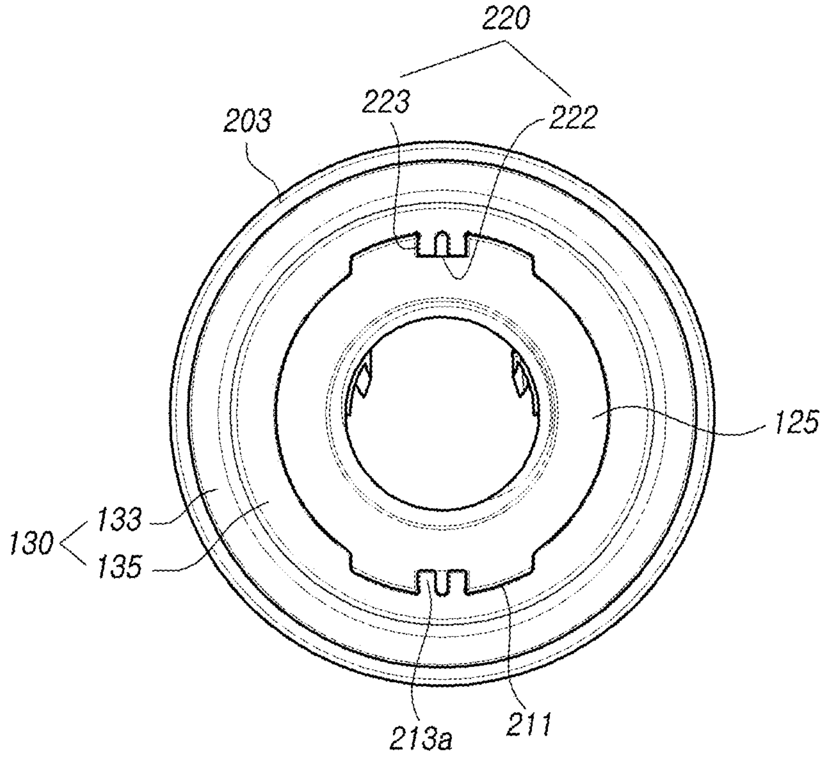
FIG. 8 is a front view illustrating a portion of a power assisted steering device according to an embodiment of the present disclosure.
Figure 9:
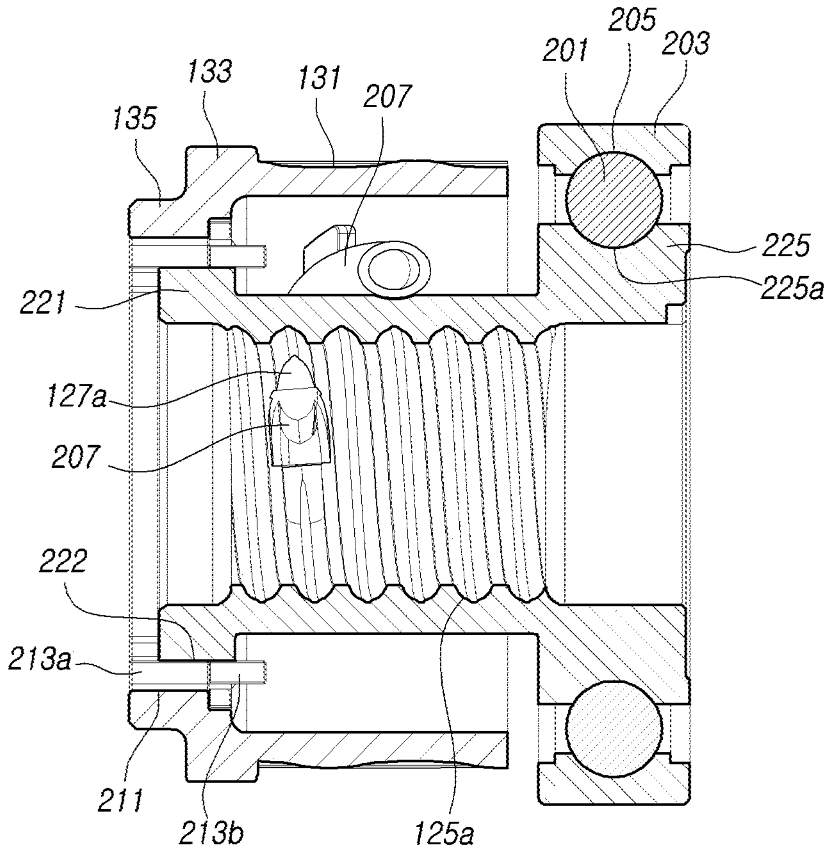
FIG. 9 is a cross-sectional view of FIG. 8.

FIG. 1 is a view schematically illustrating a configuration of a power assisted steering device according to an embodiment of the present disclosure. FIG. 2 is a perspective view illustrating a portion of a power assisted steering device according to an embodiment of the present disclosure. FIG. 3 is an exploded perspective view illustrating a portion of a power assisted steering device according to an embodiment of the present disclosure. FIG. 4 is a perspective view illustrating a portion of a power assisted steering device according to an embodiment of the present disclosure. FIG. 5 is an enlarged view of a portion of FIG. 4. FIGS. 6 and 7 are perspective views illustrating a portion of a power assisted steering device according to an embodiment of the present disclosure. FIG. 8 is a front view illustrating a portion of a power assisted steering device according to an embodiment of the present disclosure. FIG. 9 is a cross-sectional view of FIG. 8.

A power assisted steering device according to an embodiment of the present disclosure may include a rack bar 120 having an outer circumferential screw groove **120*a* formed on an outer circumferential surface of the rack bar 120, a ball nut 125 having an inner circumferential screw groove 125*a*, corresponding to the outer circumferential screw groove 120*a* of the rack bar 120, formed on an inner circumferential surface of the ball nut 125 to be rotatably coupled to the rack bar 120 via balls and having a nut fastening portion 220 formed on an outer circumferential surface of the ball nut 125, and a nut pulley 130 coupled to the outer circumferential surface of the ball nut 125 and having a pulley fastening portion 210, coupled to the nut fastening portion 220 of the ball nut 125, formed on an inner circumferential surface of the nut pully 130**.

A power assisted steering device according to an embodiment of the present disclosure may include a ball nut 125 rotatably coupled to a rack bar 120 via balls, having a large diameter portion 221 having a larger diameter protruding outward in a radial direction on an outer circumferential surface of the ball nut 125, and having a nut fastening portion 220 formed at the large diameter portion 221, and a nut pulley 130 coupled to an outer circumferential surface of the ball nut 125, having a pulley fastening portion 210 coupled to the nut fastening portion 220 on an inner circumferential surface of an end portion of the nut pulley 130, and formed of one or more materials selected from the group consisting of poly acetal (POM), poly amide (PA), poly carbonate (PC), poly imide (PI), polybutylene terephthalate (PBT), polyphenylene sulfide (PPS), and phenol formaldehyde (PF).

In the power assisted steering device according to an embodiment of the present disclosure, a torque sensor 103 may be coupled to one side of steering shafts 102 and 106 connected with a steering wheel 101. The driver's manipulation of the steering wheel 101 or the rotation of the steering shaft 102 and 106 is detected by the torque sensor 103, a steering angle sensor 121, or a vehicle speed sensor 122, and a resultant electric signal is transmitted to the motor 113 to steer wheels 115 via tie rods 119.

In the power assisted steering device according to an embodiment of the present disclosure, the upper steering shaft 102 is connected to the lower steering shaft 106 through a universal joint 104 so that the steering is performed through a rack-pinion mechanism 116 having a pinion 108 and a rack gear 112.

Here, the driving power of the motor 113 driven or controlled by the electronic control unit 111 is transferred to the ball nut 125 through the motor pulley 123, the belt 150, and the nut pulley 130. The rack bar 120 operably coupled to the ball nut 125 is axially slidable via the balls. The tie rods 119 are coupled to two opposite sides of the rack bar 120, and the tie rods 119 are coupled to the knuckle arms 117 connected to wheels 115 to steer the wheels 115.

The electric signal generated from the torque sensor 103 is transmitted to an electronic control unit (ECU) 111, and the ECU 111 controls the motor 113 based on the electric signal received from the torque sensor 103 and the electric signals received from the steering angle sensor 121 and the vehicle speed sensor 122 mounted to the vehicle.

A power transmission structure is provided on the outer circumferential surface of the rack bar 120 and the inner circumferential surface of the ball nut 125 so that the rack back 120 can axially slide to generate steering assist power. The power transmission structure includes an outer circumferential screw groove **120*a* spirally formed on the outer circumferential surface of the rack bar 120 and having a semi-circular or arc-shaped cross section, an inner circumferential screw groove 125*a* spirally formed on the inner circumferential surface of the ball nut 125 to correspond to the outer circumferential screw groove 120*a* and having a semi-circular or arc-shaped cross section, and balls rotatably disposed between the outer circumferential screw groove 120*a* and the inner circumferential screw groove 125*a***.

In the ball nut 125 having the inner circumferential screw groove **125*a* formed on the inner circumferential surface of the ball nut 125, a pair of ball circulation holes passing through the inner circumferential surface and outer circumferential surface are spaced apart from each other in the central axis direction along the inner circumferential screw groove 125*a***.

Accordingly, the balls that roll along the inner circumferential screw groove **125*a* may be circulated through the ball circulation hole 127*a* and the ball circulation tube 207**.

The nut pulley 130 is provided on the outer circumferential side of the ball nut 125. The nut fastening portion 220 is provided on the outer circumferential surface of one side end portion of the ball nut 125 and is coupled to the pulley fastening portion 210 of the nut pulley 130 described below.

The large diameter portion 221 has a diameter larger than a diameter of another portion of the ball nut 125, protrudes outwardly in the radial direction, and is provided on the outer circumferential surface of one side end portion of the ball nut 125, and the nut fastening portion 220 is provided at the large diameter portion 221.

The outer circumferential surface of the large diameter portion 221 of the ball nut 125 is coupled in tight contact with the inner circumferential surface of the nut pulley 130, and a central portion of the ball nut 125 is disposed to have a space as the inner circumferential surface of the nut pulley 130 is spaced apart from the outer circumferential surface of the ball nut 125.

The ball circulation tube 207 is disposed in the space between the inner circumferential surface of the nut pulley 130 and the outer circumferential surface of the ball nut 125 and is coupled to the ball nut 125.

The large diameter portion 221 of the ball nut 125 may have a ring shape protruding outward in the radial direction from the outer circumferential surface of one side end portion of the ball nut 125.

The nut fastening portion 220 is formed so that two opposite sides of the large diameter portion 221 in the central axis direction of the ball nut 125 are opened by having a cut shape on the outer circumferential surface of the large diameter portion 221. The pulley fastening portion 210 of the nut pulley 130 is coupled in tight contact with the cut inner surface 222 of the nut fastening portion 220 recessed in the circumferential direction.

The nut pulley 130 is formed in a hollow shape and has a belt coupling portion 131 and a supporting end portion 133 on the outer circumferential surface of the nut pulley 130, and an extending end portion 135 is formed on the side surface of the supporting end portion 133 in the axis direction.

The belt coupling portion 131 has successive grooves to prevent a slip with the belt and, if the belt is coupled, the side surface of the belt is supported by the supporting end portion 133 to prevent the belt from falling off from the nut pulley 130.

The pulley fastening portion 210 is provided on the inner circumferential surface of the extending end portion 135 of the nut pulley. The pulley fastening portion 210 is formed to extend from the outer end of the extending end portion 135 inwardly beyond the inner end of the extending end portion 135.

The nut pulley 130 has a circumferential recess 211 is formed on the inner circumferential surface of the extending end portion 135 of the nut pulley 130. For example, the nut pulley 130 is formed by being cut outward in the radial direction on the inner circumferential surface of the nut pulley 130 at the position facing the nut fastening portion 220, and the pulley fastening portion 210 is formed to protrude inward in the radial direction in or from the circumferential recess 211.

The circumferential recess 211 is extended to two opposite sides from the pulley fastening portion 210, and the pulley fastening portion 210 is formed to protrude inward in the radial direction in or from the central portion of the circumferential recess 211 to be coupled to the nut fastening portion 220.

The pulley fastening portion 210 has a stopping protrusion **213*c* circumferentially protruding at the inner end of the nut pulley 130 in the central axis direction to be supported by the inner end of the nut fastening portion 220, and an inclined surface 213*d* is provided in the circumferential outer surface of the stopping protrusion 213*c***.

Accordingly, when the nut pulley 130 and the ball nut 125 are coupled, the stopping protrusions **213*c* of the pulley fastening portion 210 are supported by the two opposite supporting surfaces 223 of the nut fastening portion 220** and are coupled while being elastically deformed to come close inward.

If the coupling of the nut pulley 130 and the ball nut 125 is completed, the pulley fastening portion 210 is elastically restored, and the stopping protrusions **213*c* are supported and fixed on the inner end of the nut fastening portion 220** and are thus prevented from falling off in the central axis direction.

A pair of pulley fastening portions 210 may be formed that are spaced apart from each other and are parallel in the central axis direction.

Each of the pair of pulley fastening portions 210 has stopping protrusions **213*c* circumferentially protruding at the inner end of the nut pulley 130 in the central axis direction and supported by the inner end of the nut fastening portion 220**.

Accordingly, as described above, when the nut pulley 130 and the ball nut 125 are coupled to each h other, the stopping protrusions **213*c* of each of the pair of pulley fastening portions 210 are supported on the two opposite supporting surfaces 223 of the nut fastening portion 220 while being elastically deformed to come close inward and coupled and, if the coupling of the nut pulley 130 and the ball nut 125 is completed, each of the pair of pulley fastening portions 210 is elastically restored so that the stopping protrusions 213*c* are supported and fixed by the inner end of the nut fastening portion 220, thereby preventing the nut pulley 130 from falling off from the ball nut 125** in the central axis direction.

Each of the pulley fastening portions 210 may include a first fastening portion **213*a*, 213*a*-1 formed to have a constant thickness and extending from one side end portion of the nut pulley 130 in the central axis direction and a second fastening portion 213*b*, 213*b*-1 connected to the first fastening portion 213*a*, 213*a*-1 and having a thickness smaller than the first fastening portion 213*a*, 213*a*-1**.

The stopping protrusion **213*c* is formed at the inner end of the second fastening portion 213*b*, 213*b*-1, and the inclined surface 213*d* is provided in the circumferential outer surface of the stopping protrusion 213*c***.

Thus, elastic deformation of the second fastening portion **213*b*, 213*b*-1 supported on two opposite side supporting surfaces 223 of the nut fastening portion 220 when the nut pulley 130 and the ball nut 125** are coupled may be further facilitated.

Further, if the coupling of the nut pulley 130 and the ball nut 125 is completed, the first fastening portion **213*a*, 213*a*-1 which has a larger diameter than the second fastening portion 213*b*, 213*b*-1 is supported on the cut inner surface 222 of the nut fastening portion 220 and the two opposite side supporting surfaces 223, thereby preventing the first fastening portion 213*a*, 213*a*-1** from falling off in the central axis direction and the circumferential direction.

Further, on the outer circumferential surface of the other side end portion of the ball nut 125 is provided a protruding end portion 225 that has a larger diameter outwardly in the radial direction, and an annular seating groove **225*a* where a spherical rotating member 201 is seated to rotate is provided on the outer circumferential surface of the protruding end portion 225**.

A supporting ring 203 having an annular supporting groove 205 formed where the rotating member 201 is seated to rotate and formed on the inner circumferential surface is coupled to the outside of the protruding end portion 225, supporting the rotation of the ball nut 125.

Accordingly, when the ball nut 125 rotates, the supporting ring 203 is supported by the rack housing (not shown) in order to support the rotation of the ball nut 125.

Further, the ball nut 125 has a pair of ball circulation holes 127*a* passing through the outer circumferential surface and inner circumferential surface of the ball nut 125 between the large diameter portion 221 and the protruding end portion 225, and one end and the other end of the ball circulation tube 207 connected to the outer circumferential screw groove 120*a* and the inner circumferential screw groove 125*a* are coupled to the ball circulation hole 127*a* to circulate the balls from the inner end to the other end of the ball nut 125.

A power assisted steering device according to an embodiment of the present disclosure may include the ball nut 125 rotatably coupled to the rack bar 120 via balls, having a large diameter portion 221 having a larger diameter outwardly in a radial direction on an outer circumferential surface of one side end portion of the ball nut 125, and having the nut fastening portion 220 formed in the large diameter portion 221 and the nut pulley 130 coupled to an outer circumferential surface of the ball nut 125, having the pulley fastening portion 210 coupled to the nut fastening portion 220 on an inner circumferential surface of an end portion of the nut pulley, and formed of one or more materials selected from the group consisting of poly acetal (POM), poly amide (PA), poly carbonate (PC), poly imide (PI), polybutylene terephthalate (PBT), polyphenylene sulfide (PPS), and phenol formaldehyde (PF).

Accordingly, a power assisted steering device according to an embodiment of the present disclosure can reduce the weight of the ball nut 125 and the nut pulley 130, precisely form the shape of the pulley fastening portion 210 by injection molding, and reduce wear or noise due to friction with the belt.

The nut pulley 130 may be formed by further mixing glass fibers with the above-described material, and preferably, the glass fibers may be mixed at 5 wt % to 10 wt %.

The glass fibers may be a mixture of cylindrical glass fibers or plate-shaped glass fibers, and the inclusion of the glass fibers in the nut pulley 130 may enhance hardness, tensile strength, elongation, flexural strength, high-temperature properties and provide excellent frictional properties and enhanced durability.

Here, if the glass fibers less than 5 wt % are mixed when producing the nut pulley 130, the hardness and tensile strength required for the nut pulley 130 may be reduced, and if the glass fibers more than 10 wt % are mixed when producing the nut pulley 130, the hardness and tensile strength of the nut pulley 130 may be increased, but the elongation and flexural strength, high-temperature properties, and durability may be rather deteriorated.

Further, the nut pulley 130 may be formed by further mixing carbon fibers with the above-described material, and preferably, the carbon fibers may be mixed at 5 wt % to 10 wt %.

The inclusion of the carbon fibers in the nut pulley 130 may enhance hardness, tensile strength, elongation, flexural strength, high-temperature properties and provide excellent frictional properties and enhanced durability.

Here, if the carbon fibers less than 5 wt % are mixed when producing the nut pulley 130, the hardness and tensile strength required for the nut pulley 130 may be reduced, and if the glass fibers more than 10 wt % are mixed when producing the nut pulley 130, the hardness and tensile strength may be increased, but the elongation and flexural strength, high-temperature properties, and durability may be rather deteriorated.

According to some embodiments of the present disclosure, it may be possible to allow to easily couple the ball nut and the nut pulley, simplify a manufacturing process, reduce weight, and secure required rigidity in a power assisted steering device.

Further, according to certain embodiments of the present disclosure, it may be possible to reduce vibration and rattle generated while the ball nut and the nut pulley operate, thereby providing convenience and comfort to the driver while driving.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A power assisted steering device, comprising:

a rack bar having an outer circumferential screw groove formed on an outer circumferential surface of the rack bar;

a ball nut having an inner circumferential screw groove formed on an inner circumferential surface of the ball nut to be rotatably coupled to the rack bar via balls, and a large diameter portion having an increased diameter outwardly from the outer circumferential surface of the ball nut in a radial direction, and at least one nut fastening portion recessed from an outer circumferential surface of the large diameter portion; and a nut pulley coupled to the outer circumferential surface of the ball nut, the nut pulley having at least one pulley fastening portion protruding from an inner circumferential surface of the nut pulley to be coupled to the nut fastening portion of the ball nut, wherein the nut pulley comprises:

a belt coupling portion to which a belt is coupled on an outer circumferential surface of the belt coupling portion;

a supporting end portion having a diameter increasing radially outward from an end of the belt coupling portion and supporting a side surface of the belt; and an extending end portion extending from a side surface of the supporting end portion in a central axis direction and supporting a side surface of the large diameter portion in the central axis direction.

2. The power assisted steering device of claim 1, wherein an outer circumferential surface of the large diameter portion of the ball nut is in contact with the inner circumferential surface of the nut pulley.

3. The power assisted steering device of claim 1 , wherein the large diameter portion of the ball nut is formed to annularly protrude from the outer circumferential surface of the ball nut.

4. The power assisted steering device of claim 3, wherein the nut fastening portion of the ball nut has a cut shape on an outer circumferential surface of the large diameter portion of the ball nut.

5. The power assisted steering device of claim 4, wherein the pulley fastening portion of the nut pulley is coupled in contact with a cut-shaped inner circumferential surface of the nut fastening portion of the ball nut.

6. The power assisted steering device of claim 4, wherein the nut pulley has a circumferential recess formed on an inner circumferential surface of the nut pulley at a position facing the nut fastening portion of the ball nut, and the pulley fastening portion of the nut pulley protrudes inward in the circumferential recess formed on the inner circumferential surface of the nut pulley.

7. The power assisted steering device of claim 6, wherein the circumferential recess formed on the inner circumferential surface of the nut pulley is extended in opposite circumferential directions from the pulley fastening portion of the nut pulley.

8. The power assisted steering device of claim 7, wherein the pulley fastening portion of the nut pulley has a stopping protrusion protruding circumferentially at an inner end of the pulley fastening portion of the nut pulley and supported by an inner end of the nut fastening portion of the ball nut.

9. The power assisted steering device of claim 8, wherein a circumferential outer surface of the stopping protrusion of the pulley fastening portion of the nut pulley includes an inclined surface.

10. The power assisted steering device of claim 6, wherein the at least one pulley fastening portion of the nut pulley comprises a pair of pulley fastening portions spaced apart from each other and arranged in parallel to each other in an axis direction.

11. The power assisted steering device of claim 10, wherein each of the pair of pulley fastening portions of the nut pulley has a stopping protrusion protruding circumferentially at an inner end of each of the pair of pulley fastening portions and supported by an inner end of the at least one nut fastening portion of the ball nut.

12. The power assisted steering device of claim 11, wherein each of the pair of pulley fastening portions includes:

a first fastening portion extending in the axis direction from a first end portion of the nut pulley and having a constant thickness; and a second fastening portion extended from the first fastening portion and having a smaller thickness than the first fastening portion.

13. The power assisted steering device of claim 12, wherein the stopping protrusion is provided at an end of the second fastening portion, and wherein a circumferential outer surface of the stopping protrusion of the second fastening portion includes an inclined surface.

14. The power assisted steering device of claim 2, wherein a protruding end portion having an increased diameter outwardly in the radial direction is provided on the outer circumferential surface of the ball nut, and an annular seating groove on which a spherical rotating member is rotatably disposed is formed on an outer circumferential surface of the protruding end portion of the ball nut.

15. The power assisted steering device of claim 14, wherein a supporting ring is coupled to the protruding end portion of the ball nut to support rotation of the ball nut, and the supporting ring has an annular supporting groove on which the spherical rotating member is rotatably disposed, the annular supporting groove formed on an inner circumferential surface of the supporting ring.

16. The power assisted steering device of claim 14, wherein the ball nut has a pair of ball circulation holes passing through an outer circumferential surface and inner circumferential surface of the ball nut and positioned between the large diameter portion and the protruding end portion of the ball nut, and a ball circulation tube disposed between the outer circumferential screw groove of the rack bar and the inner circumferential screw groove of the ball nut is coupled to the ball circulation holes to circulate the balls.

* * * * *